US005983927A

United States Patent [19]

Simon et al.

[11] Patent Number: 5,983,927

[45] Date of Patent: Nov. 16, 1999

[54] INLET VALVE ASSEMBLY

[75] Inventors: Jean-Luc Simon, Le Troncq; Claude Jouillat, Montigny-sur-Avre, both of France

[73] Assignee: Valois S.A., Le Neubourg, France

[21] Appl. No.: 08/930,987

[22] PCT Filed: Apr. 3, 1996

[86] PCT No.: PCT/FR96/00501

§ 371 Date: Feb. 3, 1998

§ 102(e) Date: Feb. 3, 1998

[87] PCT Pub. No.: WO96/31718

PCT Pub. Date: Oct. 10, 1996

[30] Foreign Application Priority Data

Apr. 7, 1995 [FR] France .................................. 95 04188

[51] Int. Cl.[6] ................................................. F16K 15/00

[52] U.S. Cl. ................................ 137/516.27; 137/533.31

[58] Field of Search ......................... 137/516.27, 533.31, 137/533.21, 843, 533; 417/562

[56] References Cited

U.S. PATENT DOCUMENTS

| | | | |
|---|---|---|---|
| 1,072,673 | 9/1913 | Thelen | 137/533.31 |
| 2,771,902 | 11/1956 | Winchester | 137/533.31 |
| 3,054,422 | 9/1962 | Napolitano | 137/516.27 |
| 3,540,472 | 11/1970 | Brady | 137/533.21 |
| 3,677,286 | 7/1972 | Wolfson | 137/533.31 |
| 3,897,042 | 7/1975 | Kachergis | 137/533.21 |
| 4,518,329 | 5/1985 | Weaver | 137/516.27 |
| 4,532,958 | 8/1985 | Napolitano | 137/516.27 |
| 4,846,216 | 7/1989 | Raymond | 137/516.27 |
| 5,039,284 | 8/1991 | Talaski | 137/546.27 |
| 5,054,518 | 10/1991 | Rancani | 137/516.27 |
| 5,307,962 | 5/1994 | Lin . | |

FOREIGN PATENT DOCUMENTS

| | | |
|---|---|---|
| 213476 | 3/1987 | European Pat. Off. . |
| 599186 | 6/1994 | European Pat. Off. . |
| 1813599 | 10/1969 | Germany . |
| WO9501226 | 1/1995 | WIPO . |

*Primary Examiner*—Henry Bennett
*Assistant Examiner*—Joanne Y. Kim
*Attorney, Agent, or Firm*—Sughrue, Mion, Zinn, Macpeak & Seas, PLLC

[57] ABSTRACT

The invention proposes an inlet valve assembly integrated in apparatus for dispensing a fluid contained in a tank, the valve assembly serving to isolate said tank at least during a dispensing stage during which said fluid is dispensed, said valve assembly comprising a valve member (2) having a contact zone coming into sealed contact with a substantially frustoconical valve seat (16) at least during said dispensing stage, the contact zone of the valve member (2) being part of a substantially frustoconical surface (210), said inlet valve assembly being characterized in that the solid angle of the surface (210) is greater than that defined by the valve seat (16) so that the contact zone is at least initially defined by a circle when the valve member is at rest, and in that the frustoconical surface (210) is formed by a substantially flexible wall, so that the initially circular contact zone extends to form a truncated cone by resilient deformation during the dispensing stage.

13 Claims, 3 Drawing Sheets

INLET VALVE ASSEMBLY

BACKGROUND OF THE INVENTION

The present invention relates to an inlet valve assembly that can be integrated in apparatus for dispensing a fluid or a semi-fluid. In general, this type of valve assembly is inserted in a pump body, at the bottom thereof, for performing the function of inlet valve so as to isolate the pump chamber from the tank containing the fluid to be dispensed during the dispensing stage. However, the valve assembly of the invention may also be used as an outlet valve.

A very widely used type of inlet valve assembly uses a metal ball as the dynamic member of the valve, which member comes into sealed contact with a valve seat that is generally an integral part of the pump body under the effect of the pressure exerted on the fluid in the pump chamber. The ball is held in a small space by a valve holder which is in general inserted by force into the bottom of the pump body. The valve holder is provided with a passage that causes the above-mentioned small space to communicate with the pump chamber proper. The ball can be displaced freely within the small space without it being possible for it to close off the communicating passage. It is only during the dispensing stages, i.e. while the fluid is being put under pressure, that the ball is pressed against it seat.

Although widely used in all sorts of dispensing apparatus even other than pumps, such a ball suffers from certain drawbacks.

From the point of view of physics, the ball is made of a material having a high density, namely steel. The weight of the ball is thus relatively large. With respect to its dynamic behavior, when the dispensing apparatus is used upside-down, i.e. with the valve seat uppermost, the ball does not respond immediately to the effect of the pressure, but rather it takes a certain amount of time to reach its place against the valve seat. The pressure must be high enough to overcome the weight of the ball. The difficulty encountered by the ball in moving upwards against its seat is further increased by the fact that its shape is advantageous from the hydraulics point of view. The surface quality of the metal ball and its shape offer very little resistance to the fluid.

Furthermore, from the ecological point of view, the ball constitutes a metal element that prevents the dispensing apparatus in which it is integrated from being recycled, unless it is disassembled first. The current trend is for metal elements not to be included in products that are made of a majority of plastic, as is the case for a pump.

Moreover, while they are being transported or assembled, such balls collide, which damages their surfaces, thereby giving rise to sealing defects.

From the economics point of view, such a ball is a costly part because it is made of steel and it must be exactly spherical. It has also been observed that many such balls are lost during transport or handling because of their spherical shape that is difficult to grasp.

There are other types of inlet valve that do not use balls as dynamic members. For example, some types of dispensing apparatus incorporate a valve in the form of an elastomer washer which is captively mounted in a small space. When the pressure increases in the dispensing chamber of the apparatus, the washer is pressed in sealed manner against the inlet orifice. The sealed contact is achieved merely by the washer being applied axially against the inlet orifice. Thus, to obtain good sealing, it is necessary for the pressure exerted on the washer to be large enough.

In most prior art inlet valves, a valve member (ball, washer, etc.) is confined to a small volume by a valve holder. In all cases, the valve member is not coupled to any other part, and it can float in the volume with which it is associated.

Document WO 95/01226 defines a valve whose valve member has a frustoconical section coming into contact with a frustoconical valve seat. Sealing contact is obtained over an area that is frustoconical because the valve member and the seat define the same solid angle.

SUMMARY OF THE INVENTION

An object of the present invention is to remedy the drawbacks of the above-mentioned prior art by defining an inlet valve assembly that is capable of making sealing contact rapidly and of very good quality. The valve member must respond immediately by closing off the inlet orifice as from the beginning of the dispensing stage. The valve member must further be able to reach the valve seat in all configurations, i.e. when the apparatus is upright, upside-down or on its side. Another object of the invention is to make it possible to use a conventional valve holder that is normally suitable for receiving a ball. Since such an element is mass produced cheaply, the cost of the assembly is thus lower. It must also be possible for the valve member that replaces the ball to be manufactured at a cost lower than that of the ball, while procuring improved sealing.

The valve assembly of the invention should offer sealing whose quality improves with increasing pressure in the pump chamber.

To achieve this, the present invention provides an inlet valve assembly integrated in apparatus for dispensing a fluid contained in a tank, the valve assembly serving to isolate said tank at least during a dispensing stage during which said fluid is dispensed, said valve assembly comprising a valve member having a contact zone coming into sealed contact with a substantially frustoconical valve seat at least during said dispensing stage, the contact zone of the valve member being part of a substantially frustoconical surface, said inlet valve assembly being characterized in that the solid angle of the surface is greater than that defined by the valve seat so that the contact zone is at least initially defined by a circle when the valve member is at rest, and in that the frustoconical surface is formed by a substantially flexible wall, so that the initially circular contact zone extends to form a truncated cone by resilient deformation during the dispensing stage. The valve seat of the invention is typically that of a ball valve. It is formed by the mouth of the inlet channel that is an integral part of the pump body. The valve member is very different from a ball. Since the truncated cones defined by the seat and by the valve member are different, annular contact is created. At rest, when the apparatus is held upright with the seat at the bottom, the annular contact exists. However, it is very different from that existing with a ball. The contact existing with a ball is of the circle-and-tangent type, whereas the contact obtained with the valve member of the invention creates a frustoconical volume of tapering thickness between the seat and the frustoconical surface. The gap between the seat and the frustoconical surface is so small that the fluid can build up therein by capillary action over a relatively long distance. The built-up fluid contributes to holding the valve member against its seat by increasing their cohesion. This is not the case with a ball on which only a very small quantity of liquid can be built up by capillary action. The increase in the surface tension obtained with the valve member of the invention comes directly from the difference in solid angle between the frustoconical surface and the valve seat. This increased surface tension makes it possible to increase the sealing quality significantly, especially at rest, the fluid retained by capillary action then acting as a fluid plug.

The sealing annular contact that exists when the apparatus is at rest is transformed into frustoconical contact during the dispensing stage. When the pressure increases in the dispensing chamber of the apparatus, a force is exerted on the flexible wall, thereby deforming it and pressing it against the valve seat. The higher the pressure, the larger the contact zone. Sealing thus increases with pressure. Moreover, due to the difference in solid angle and in deformation capability, the contact at the original annular contact zone is made firmer. The resilience of the wall increases sealing by exerting a force the is radial rather than axial. The resilience thus makes it possible to transform a pressure exerted axially into a reaction force which acts radially.

Advantageously, the valve member includes a cap extending outwards frustoconically, and having an outside frustoconical wall that defines said frustoconical surface. Thus, the pressure that is exerted on the cap tends to deform it outwards and presses the frustoconical surface to an even greater extent against the valve seat, particularly at its largest diameter corresponding to the original annular contact zone. The combined effect of the resilience of the cap together with the pressure that urges it radially outwards makes it possible to improve the sealing of the valve.

According to a characteristic, the valve member includes a stem having a bottom end, the cap being formed at said bottom end. The valve member is shaped like an upside-down mushroom or umbrella. The concave annular shape defined by the outside of the cap can be engaged well by the fluid, so that the valve member responds instantly to the flow of fluid that is created at the beginning of the dispensing stage. In addition, since the valve member is made of a plastics material, it offers only a very small amount of inertial resistance.

According to another characteristic, the displacement of the valve member is limited by a valve holder between a closed position and a suction position. The valve holder is preferably a conventional valve holder that is normally suited to receiving a ball.

Advantageously, the top end of the stem is engaged in a passage formed by the valve holder. This enables the valve member to be maintained always substantially on the axis because the stem cannot be disengaged from the passage.

In addition, the cap includes a cylindrical end portion extending the frustoconical wall. This cylindrical portion performs two functions. Firstly, it protects the frustoconical surface, and more particularly the zone of largest diameter corresponding to the original annular contact zone. Secondly, the top surface of the cylindrical portion can serve as a sliding skid at the outlet of the dispensing bowl for angularly positioning the valve member.

Advantageously, the stem comprises two cylindrical sections of different diameters interconnected by a transition surface. The transition surface serves as an abutment for the valve member in the suction position. Preferably, the valve holder defines abutment means for the valve member in the suction position by coming into contact simultaneously with an outer end edge of the cylindrical end portion and with the transition surface, so as to hold the valve member on the axis when it is in the suction position.

BRIEF DESCRIPTION OF THE DRAWINGS

An embodiment of the present invention is described in more detail below by way of non-limiting example and with reference to the accompanying drawings, in which.

DESCRIPTION OF THE PREFERRED

Figure 1:
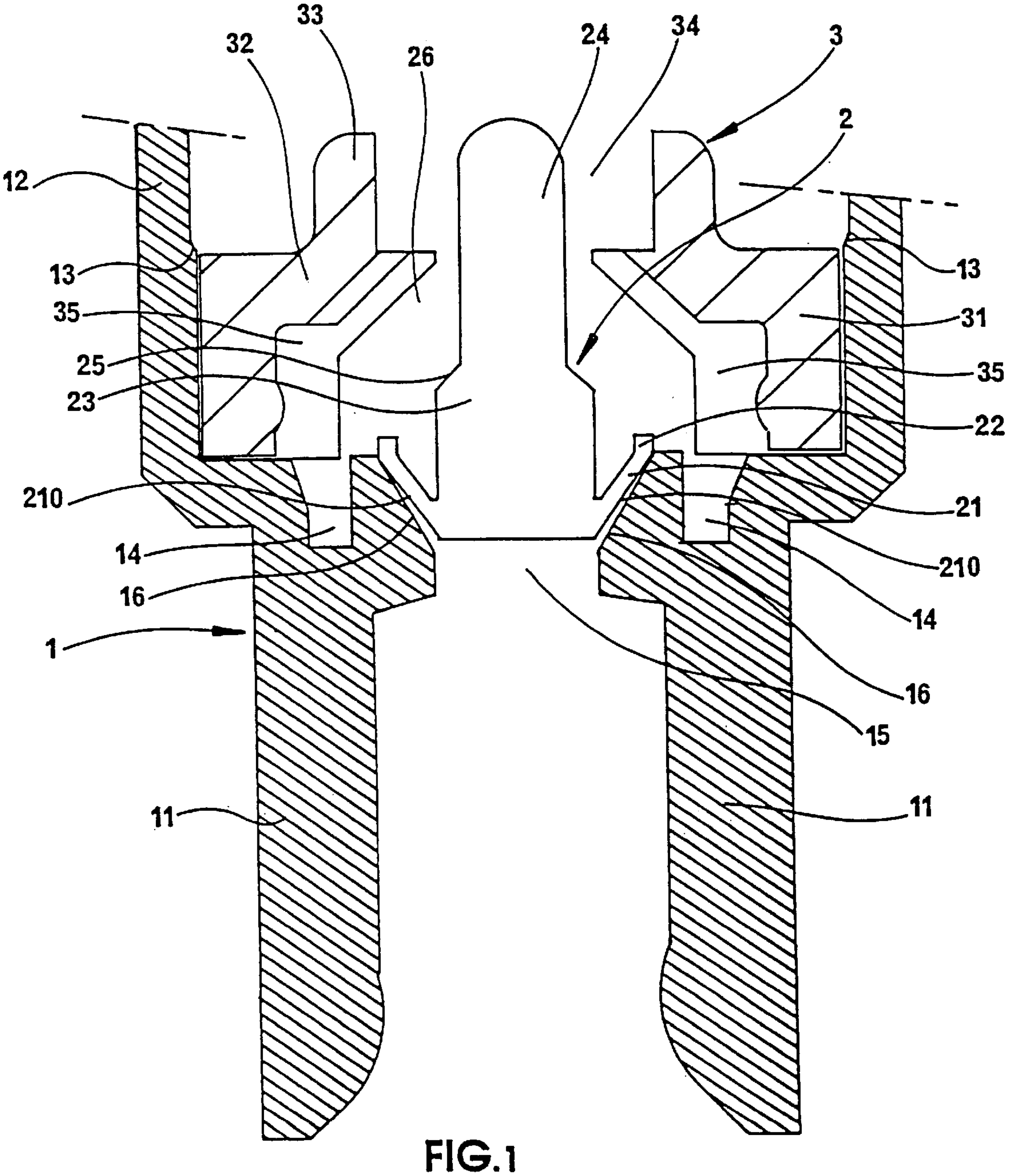
FIG. 1 is a section view of a inlet valve assembly of the invention, as integrated in a pump body, the valve member being in a rest position.
Figure 2:
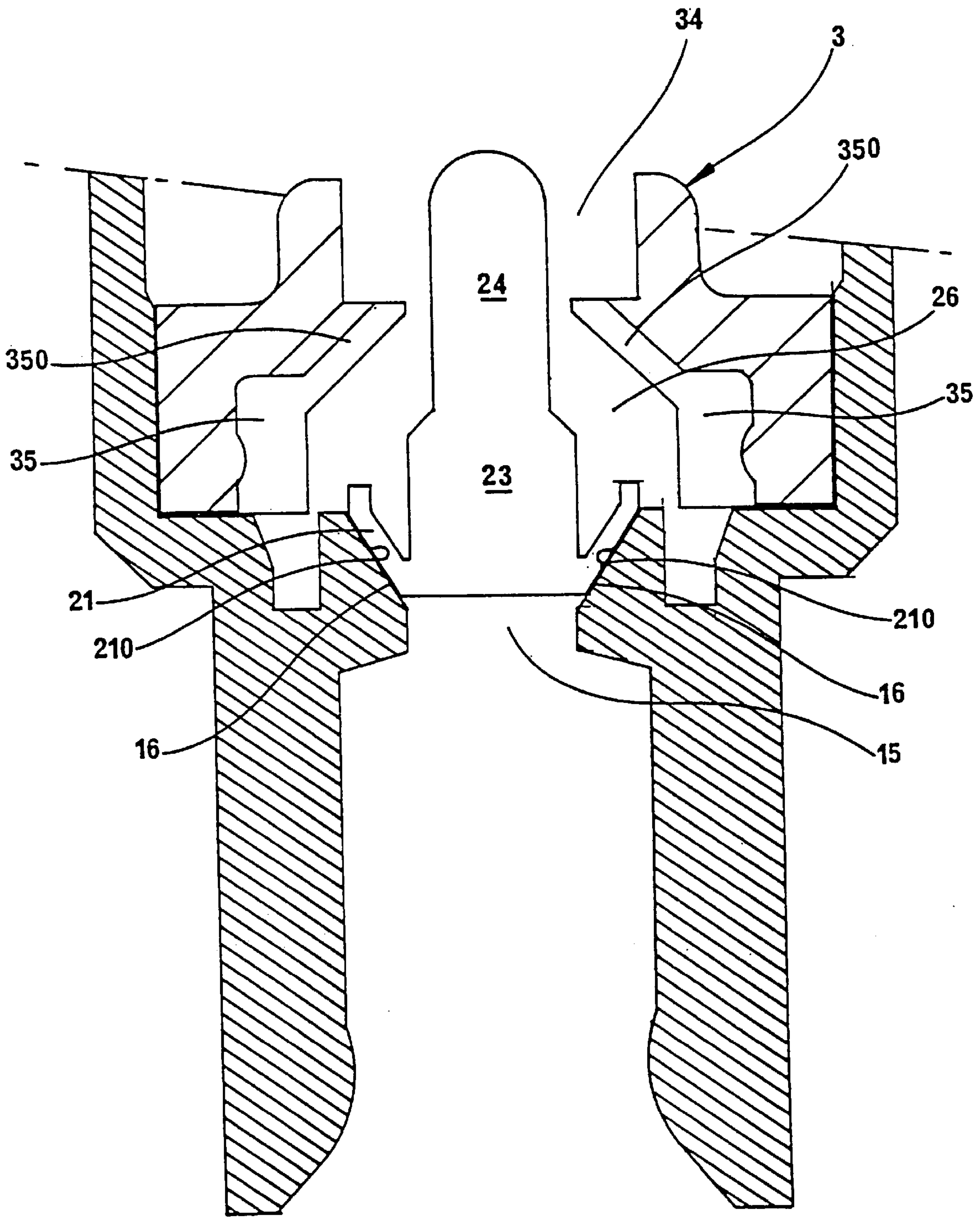
FIG. 2 is a section view of the valve assembly of FIG. 1, with the valve member being shown in the closed position.
Figure 3:
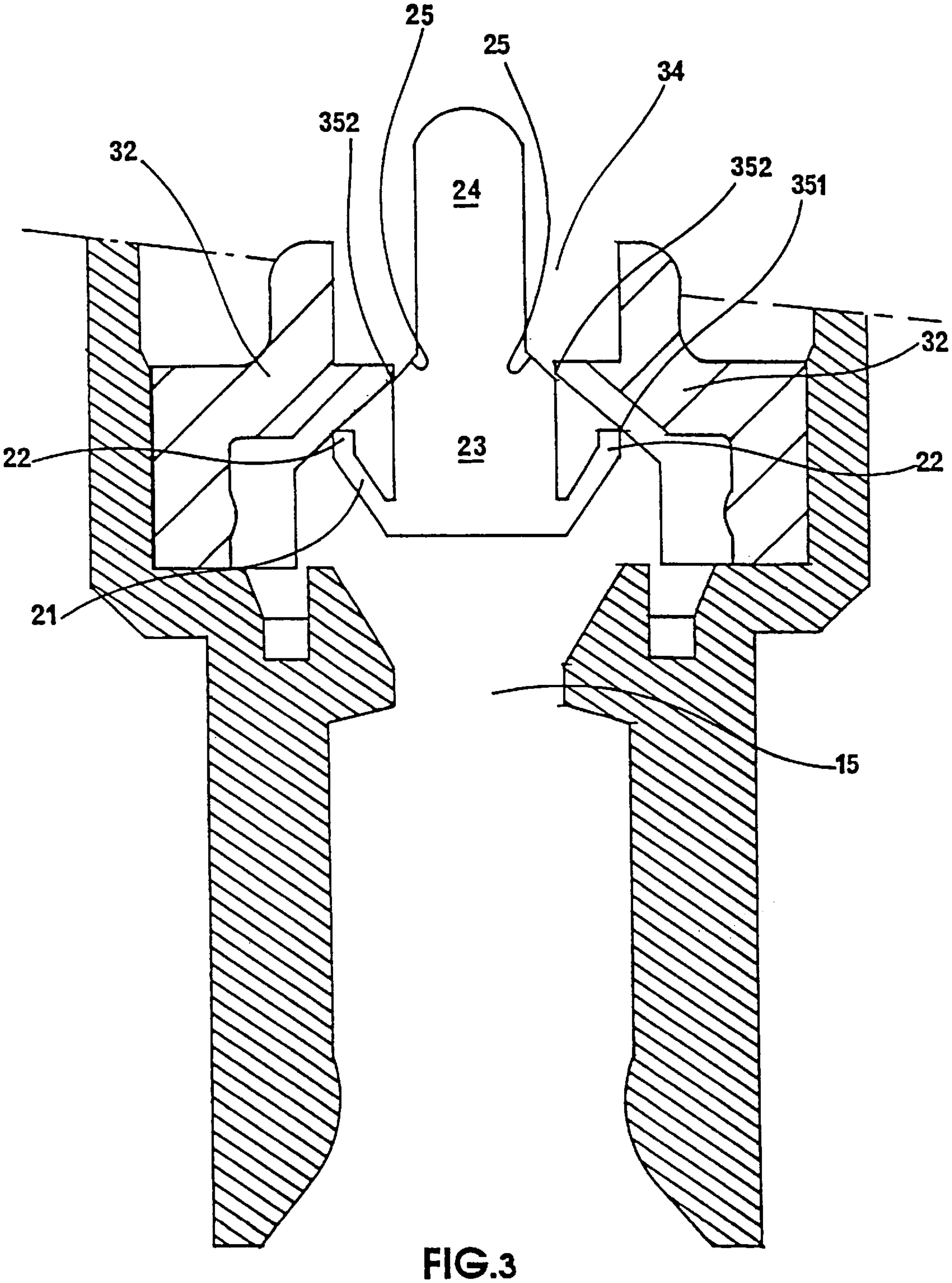
FIG. 3 is a section view of the valve assembly of FIGS. 1 and 2, with the valve member being in the suction position.

With reference to FIGS. 1 to 3, the overall structure of the inlet valve assembly is explained below. The valve assembly is integrated in a pump body 1 at the bottom thereof. The pump body is shown in part only in the figures. At the inlet valve assembly, the pump body includes a top cylindrical body and a bottom sleeve 11 in which a dip tube can be force fitted. Where the sleeve 11 and the cylindrical body 12 meet, the pump body is provided with an inlet channel 15. The inlet channel 15 is extended upwards by a frustoconical portion 16 which forms a valve seat. The valve seat 16 forms a frustoconical recess in the bottom of the cylindrical body 12. With reference to FIG. 1, it can be seen that the cylindrical body 12 has a bottom portion of smaller diameter connected to the top portion of the cylindrical body 12 via a frustoconical bevel 13. This reduction in the inside section of the cylindrical body 12 serves for force-fitting a valve holder designated by the overall reference 3. The bottom of the cylindrical body 12 is also provided with an annular groove 14 which extends concentrically about the valve seat 16. The groove 14 serves to minimize shrinkage of material after cooling, since the pump is conventionally made of a plastics material.

The above-described pump body is a conventional pump body which can be used in any dispensing apparatus such as a pump. The valve seat 16 is particularly well suited to receiving a valve member in the form of a ball. In the closed position, the ball is applied in sealed manner against the frustoconical valve seat 16. Similarly, the increase in the thickness of the wall of the cylindrical portion 12 resulting in the reduction in its inside diameter is conventionally suited to receiving a valve holder which defines a valve chamber inside which the valve member is held captive. Naturally, some other pump body may be used with the present invention without going beyond the ambit thereof. In the pump body used, the valve seat is an integral part of the pump body, but it is also possible to form a valve seat in a separate part mounted in the pump body.

The valve holder 3 used in the embodiment described is a conventional valve holder suitable for receiving a ball. The valve holder comprises an annular portion 31 whose outside periphery closely engages the inside wall of the pump body in the smaller-diameter portion thereof. The annular portion 31 is extended upwards by a frustoconical transitional portion 32 which is terminated by a ring 33. The ring 33 is provided with a central hole or passage 34 which puts the valve chamber 26 in communication with the dispensing chamber of the apparatus. Internally, the annular portion 31 and the frustoconical portion 32 are provided with a plurality of blades 35 which extend from the bottom of the cylindrical body 12 to the central hole 34. In the embodiment shown, there are four such blades 34. As explained below, the blades serve to enable the fluid to pass when the valve member is in its suction position.

In accordance with the invention, the valve member designated by the overall reference 2 is not a ball, but rather it is in the form of an elongate member whose bottom end is terminated by a frustoconical cap 21. The cap 21 is fixed to the bottom end of a stem having two different sections 23 and 24 interconnected by a frustoconical transition surface 25. In all situations, the section 24 is engaged in the central hole 34 of the valve holder 3. As shown in FIGS. 1 to 3, the valve member 2 can be displaced between a closed low position (FIG. 2) and a suction high position (FIG. 3). At. rest, the valve member is in the state shown in FIG. 1.

The outside surface of the frustoconical cap 21 defines a contact surface 210 suitable for coming into sealed contact with the valve seat 13. A particularly advantageous characteristic of the invention lies in the fact that the solid angle defined by the outside wall of the frustoconical cap 21 is greater than that defined by the frustoconical valve seat 16. Thus, in the rest position (FIG. 1), the contact zone over which the outside surface of the cap 21 is in contact with the valve seat 16 is defined by a circle which is situated in the top end portion of the valve seat. A gap of tapering thickness thus exists extending from the bottom of the valve seat to the circular contact zone. The gap is very small because the difference in angle between the cap and the seat lies in the range 1 degree to 4 degrees. As a result, liquid can build up by capillary action in the frustoconical space of tapering thickness. The built-up liquid serves to seal the dispensing chamber in the rest position. Improved sealing is thus obtained by using a valve member of the invention. With a prior art ball, liquid builds up by capillary action over a very short length only. With the present invention, the length extends from the annular contact zone to the bottom of the cap. The surface tension generated-by the build up of liquid improves the contact between the valve member and its seat.

In accordance with the invention, the valve member is made of a non-rigid material such as polyethylene, polypropylene, or an elastomer thermoplastic. A certain amount of resilience is thus imparted to the valve member. As a result of the resilience, the cap 21 can be subjected to compression and/or elongation deformation stresses. In the rest position (FIG. 1), the valve member is not subjected to any stress. However, as soon as the pressure increases in the dispensing chamber of the apparatus, the valve member 2 is subjected to the pressure in the pump body since said dispensing chamber communicates with the valve chamber via the passage 34. This pressure causes the cap 21 to be applied strongly against the valve seat 16. Because of its resilience, the valve member is slightly deformed, thereby increasing the contact zone over which the cap is in contact with the valve seat. As shown in FIG. 2, the contact zone is no longer defined by a circle, but rather it is defined by a frustoconical area. The contact area is thus considerably increased. This is made possible because the cap and the stem together form a kind of upside-down mushroom or umbrella. The pressure in the dispensing chamber exerts a force on the inside wall of the cap, thereby pushing back the cap towards the stem and causing the cap to be deformed. Because the angle between the cap and the valve seat is very small, the required deformation is very small. Due to the shape and to the resilience of the cap, the annular initial contact zone is transformed into a frustoconical contact zone. In addition, the stress exerted by the cap on the initial circular contact zone is considerably increased. The resilience and the pressure improve even further the quality of the contact with the valve seat. So long as the dispensing chamber of the apparatus remains under pressure, the valve member remains in the closed position as shown in FIG. 2. As soon as the pressure drops again in the dispensing chamber, the contact between the cap and the valve seat breaks. The following step consists in filling the dispensing chamber with fluid sucked up through the inlet channel 1. This causes the valve member to be driven upwards into its suction position.

In accordance with the invention, means are provided for holding the valve on the axis in this position. For this purpose, the cap 21 of the valve member is extended at its free end by a circular portion 22. The circular portion 22 serves two purposes; Firstly, its top surface serves as a sliding skid at the outlet of the dispensing bowl for angularly positioning the valve member. Then, in association with the transition surface 25, the outside edge of the cylindrical portion defines an imaginary truncated cone which has a solid angle identical to that of the blades 35 in the frustoconical transitional portion 32 of the valve carrier 3. Thus, in the suction position, the valve member has two annular contact zones over which it is in contact with the blades 35. The fact that there are two annular contact zones makes it possible to hold the valve member on the axis when it is in abutment in its suction position. Although the valve member can be displaced freely in the valve chamber, it is constrained to be positioned exactly on the axis both in the closed position in which it bears against the valve seat 16 and in the suction position in which it is in contact with the blades 35 at two levels.

Since the valve member of the invention is made of a plastics material rather than of steel, it has less inertia, and, as a result, it responds more rapidly to fluid flowing. It should be noted that the special shape of the cap which is upside-down mushroom or umbrella shaped makes it easier for it to be driven by the fluid into the closed position. The fluid under pressure can pour into the concave volume defined between the cap and the stem portion 23. As the dispensing chamber starts coming under pressure, a small quantity of fluid flows back out towards the tank. This quantity of fluid is very small because of the rapidity with which the valve member is displaced into its closed position. Not only is sealing improved because of the frustoconical contact zone, but also sealing is obtained more rapidly. In addition, the raw material used to make the valve member (a plastics material in the example described), is much cheaper than steel which is used to make balls.

By using a conventional pump body and a conventional valve holder, and merely by changing the valve member, better sealing characteristics are obtained.

We claim:

1. An inlet valve assembly integrated in apparatus for dispensing a fluid contained in a tank, the valve assembly serving to isolate said tank at least during a dispensing stage during which said fluid is dispensed, said valve assembly comprising a valve member (2) having a contact zone coming into sealed contact with a substantially frustoconical valve seat (16) at least during said dispensing stage, the contact zone of the valve member (2) being part of a substantially frustoconical surface (210), said inlet valve assembly being characterized in that the solid angle of the surface (210) is greater than that defined by the valve seat (16) so that the contact zone is at least initially defined by a circle when the valve member is at rest, and in that the frustoconical surface (210) is formed by a substantially flexible wall, so that the initially circular contact zone extends to form a truncated cone by resilient deformation during the dispensing stage.

2. An inlet valve assembly according to claim 1, in which the valve member (2) includes a cap (21) extending outwards frustoconically, and having an outside frustoconical wall that defines said frustoconical surface (210).

3. An inlet valve assembly according to claim 2, in which the valve member (2) includes a stem (23, 24) having a bottom end, the cap (21) being formed at said bottom end.

4. An inlet valve assembly according to claim 3, in which the top end of the stem (23) is engaged in a passage (34) formed by the valve holder (3).

5. An inlet valve assembly according to claim 2, in which the cap includes a cylindrical end portion (22) extending the frustoconical wall (210).

6. An inlet valve assembly according to claim 2, in which the stem comprises two cylindrical sections (23, 24) of different diameters and interconnected by a transition surface (25).

7. An inlet valve assembly according to claim 1, in which the displacement of the valve member is limited by a valve holder (3) between a closed position and a suction position.

8. An inlet valve assembly according to claims 6, in which the valve holder (3) defines abutment means (35) for the valve member (3) in the suction position by coming into contact simultaneously with an outer end edge of the cylindrical end portion (22) and with the transition surface (25), so as to hold the valve member on the axis when it is in the suction position.

9. An inlet valve member according to claim 1, in which the valve holder used is a conventional valve holder normally suitable for receiving a ball.

10. An inlet valve assembly according to claim 1, in which the valve member is made of a plastics material.

11. A valve assembly for use in a fluid dispensing apparatus, comprising:

a valve member having a deformable frustoconical seating surface, said deformable frustoconical seating surface adapted to assume a first position defining a solid angle greater than a solid angle defined by a frustoconical seating surface of a corresponding valve seat and adapted to assume a second position defining a solid angle substantially equal to a solid angle defined by said frustoconical seating surface of said corresponding valve seat;

wherein a contact zone between said deformable frustoconical seating surface and said frustoconical seating surface of said corresponding valve seat is defined by a line contact at said first position, wherein a contact zone between said deformable frustoconical seating surface and said second frustoconical seating surface is defined by frustoconical contact surface at said second position.

12. A valve assembly for use in a fluid dispensing apparatus according claim 11, further comprising:

a valve holder, wherein said valve holder limits a displacement of said valve member.

13. A valve assembly for use in a fluid dispensing apparatus according claim 11, wherein at least one of said valve member and said valve seat is made of a plastic material.

* * * * *